United States Patent [19]

Cain et al.

[11] Patent Number: 4,912,656

[45] Date of Patent: Mar. 27, 1990

[54] ADAPTIVE LINK ASSIGNMENT FOR A DYNAMIC COMMUNICATION NETWORK

[75] Inventors: Joseph B. Cain; Stanley L. Adams, both of Indialantic; John W. Nieto; Michael D. Noakes, both of Melbourne, all of Fla.

[73] Assignee: Harris Corporation, Melbourne, Fla.

[21] Appl. No.: 249,180

[22] Filed: Sep. 26, 1988

[51] Int. Cl.$^4$ .............................................. G06F 11/00
[52] U.S. Cl. ............................ 364/514; 364/402; 340/827
[58] Field of Search .............. 364/514, 200 MS File, 364/900 MS File, 402, 407; 371/11.2, 11.1, 8.1, 68.2; 340/827, 826, 825.03; 455/8

[56] References Cited

U.S. PATENT DOCUMENTS

4,706,080 11/1987 Sincoskie ........................ 340/825.02
4,788,721 11/1988 Krishnan et al. .................... 379/221

*Primary Examiner*—Parshotam S. Lall
*Assistant Examiner*—S. A. Melnick
*Attorney, Agent, or Firm*—Antonelli, Terry & Wands

[57] ABSTRACT

An adaptive link assignment scheme for dynamically changing communication node topologies such as satellite networks, fleets of ships or aircraft, etc. Periodically each node in the network transmits topology information to all the nodes in the network. Then each node determines the degree of connectivity of the network. It is preferred that the network be at least triconnected, and if the network is less than that each node determines what connections it can make to improve the network connectivity. If more than one alternative is available, a choice is made based on line of sight endurance and then on traffic delay. The identification of the selected connection is then broadcast to all the nodes in the network. Each node thus receives the proposed changes from all the network nodes, and each node then resolves conflicts between the broadcast selections and determines what change it should make. Finally, the changes are implemented. The scheme emphasizes network connectivity to bring the network to a triconnected state and then emphasizes line of sight endurance and reduction of traffic delay.

24 Claims, 7 Drawing Sheets

FIG. 6.1 $\quad D_T = \sum_m D_m \quad \text{WHERE} \quad D_m = \sum_k f_{mk} D_{mk}(f_{mk})$ FIG. 6.2 $\quad D_{mT} = \sum_j t_m^j \sum_{\text{link \& path}} D_{link}(f_{link})$ FIG. 6.3 $\quad \begin{cases} M_d = \dfrac{D_{mT} - D_{mT}^{new}}{D_{mT}^{new}}, & \text{WHEN } D_{mT}^{new} \leq D_{mT} \\ M_d = \dfrac{D_{mT}^{new} - D_{mT}}{D_{mT}}, & \text{WHEN } D_{mT}^{new} > D_{mT} \end{cases}$ FIG. 6.4 $\quad C = n_L + N^2 n_{L-1} + N^4 n_{L-2} + \ldots + N^{2(L-1)} n_1$ FIG. 6.5 $\quad M_{net} = (M_c + \eta M_d)(1 + \varepsilon Q_{ij}^{LOS})$

FIG. 7

```
Program LinkAssignment
    loop forever
        begin
            dispatch on "Evaluate"
                EvaluateAlternatives(topology, ephemeris);

deadline on "Broadcast"
                BroadcastSelections(selections, graphs);

dispatch on "Resolve Conflicts"
                ResolveConflicts(messages, components, graphs, iteration);

dispatch on "Initiate Link Establishment"
                InitiateLinkEstablishment(changes);
        end;
```

FIG. 8

```
Procedure EvaluateAlternatives(topology, ephemeris)

Procedure Connect(connectivity, predicate, enumerate)
begin
    components := connectivity(graphs);

if not predicate(components)
        begin
            selections := Presort(enumerate(self, components, graphs));
            RankSelections(selections, components);
            return_from EvaluateAlternatives;
        end;
end;

graphs := Partition(RemoveImminentOutages(topology, ephemeris, self));
Connect(Identity, Connected, JoinGraphs);
Connect(Biconnectivity, Biconnected, MergeBicomponents);
Connect(Triconnectivity, Triconnected, MergeTricomponents);
Connect(Identity, False, GeneralChanges);
```

```
Procedure Resolve(messages, components, graphs, iteration)

changes := { };
for selection in SortSelections(selections)
    if SelectionNodesStillAvailable(selection) and
        SelectionStillMergesComponents(selection, components) and
        SelectionNotBadBreak(selection, components)
    begin
        components := AdjustComponents(selection, components);
        MarkAffectedNodes(selection);
        if ChangeAffectsMe(selection)
            changes := Adjoin(selection, changes);
    end
```

ADAPTIVE LINK ASSIGNMENT FOR A DYNAMIC COMMUNICATION NETWORK

The U.S. government has rights in the present invention under NRL Contract N00014-86C-2056.

BACKGROUND OF THE INVENTION

The present invention relates in general to communications systems and is particularly directed to an adaptive link assignment scheme for dynamically changing communication node topologies.

In multistation or multinode communication networks it is essential to maintain communication paths between nodes to assure that communication can be had between any node in the network and any other node in the network. This is particularly critical in remote communication networks such as communication satellite networks. While equipment malfunction can result in loss of a communication link, in dynamically positioned networks such as satellite networks, communication links between nodes can also be lost if the two nodes move such that they are no longer in line of sight (LOS).

Generally each node is capable of communication over several communication links, which by way of example might be laser links or radio frequency links, or a combination thereof Thus, for example, a communication satellite might be provided with several antennas permitting it to have simultaneous communication with several other satellites over separate paths. Problems can arise in the assignment of the communication links when there are more LOS neighbors of a node than there are communication ports. In such a situation, a link assignment scheme must be utilized to determine the communication links to be established and maintained. Such a scheme must consider the desired network connectivity, determine schedules for establishing and disconnecting links, and command the establishment and disconnection of links in accordance with those schedules, all by utilizing the communication resources available to the node.

A satellite network might include, for example, 48 satellites. It is desirable that any one of the 48 satellites be able to communicate with any other of the 48 satellites. While a single communication path from any one satellite to any other satellite permits such communication, it is desirable that redundant paths be provided to assure no loss of communication in the event that a link is broken, due to either a failure at a node or a failure in a link. Thus, although the minimum link assignment that can provide the desired communication is a single path between nodes, it is desirable that at least two independent communication paths be provided between any one node and any other node in the network, and it is even more preferable that three paths exist so that communications can be maintained even in the event of breakdown of two communication paths.

Design considerations of communication paths in static networks are discussed in the text *Computer Networks*, by A. S. Tanenbaum, Prentice Hall, 1981. The paper "A Distributed Link Assignment (Reconstitution) Algorithm for Space-based SDI Networks," by J. B. Cain, S. L. Adams, M. D. Noakes, P. J. Knoke, and E. I. Althouse, published at pages 29.2.2–29.2.7 in the MILCOM '87 Conference Record, October 1987, describes an algorithm for assigning communication links in a dynamic multinode communication network. Additional detail is presented in the Harris Corporation ADNMS Technical Report "Selected Algorithm Description," dated Nov. 5, 1987 and prepared for The Naval Research Laboratory under Contract No. N00014-86-C-2056. The present invention considers key aspects of the matter and presents an improved algorithm.

SUMMARY OF THE INVENTION

The present invention is concerned with a distributed and dynamic version of such a problem. The number of distinct assignments in a network having n nodes is on the order of (n!). As a consequence, an exhaustive search to find the best network topology is impractical. Instead, the algorithm operates in an incremental fashion, continually making small changes in topology to compensate for predictable link outages due to nodes losing line of sight from other nodes. Further, the network rapidly reestablishes communication in the event of massive outages. Consequently, the algorithm is capable of determining an acceptable topology by searching only a fraction of the possible topologies. Heuristic methods are utilized, rather than an exhaustive search, and less than optimum solutions are accepted so long as they meet certain minimum criteria. Survivability of the communication network and timely message delivery are essential, particularly in military applications. Thus, the number of discrete or disjoint paths between nodes and the message delay time are the principal criteria of concern. With the present invention it is possible to maintain good topology under stress and to determine link assignments with little computational time.

The present invention thus provides a network topology that is robust and that carries the desired traffic load with low delay. The algorithm emphasizes improving the robustness or number of connections of the network topology if the topology is fragile, even at the expense of increased delay. Once the topology is reasonably robust, the algorithm optimizes both delay time and connectivity. Nevertheless, it is easily possible to emphasize other properties, such as emphasizing reduction of delay at the expense of connectivity, if desired. A dynamic network requires the use of an adaptive routing algorithm so that packets in the network will still be delivered after typical changes in the links, but the link assignment algorithm does not rely on the details of such a routing scheme. An island is defined to be a set of connected nodes, i.e. a set of nodes for which there is at least one path between all pairs of nodes. It is important that all the nodes in the network be collected into a single island but it is possible that an unfortunate sequence of link outages will split the network into multiple islands. The present invention utilizes a network management scheme which includes a periodic broadcast of a node's connectivity information to all the other nodes within its island. This can be achieved robustly by the use of a constrained flooding algorithm.

Additionally, in accordance with the present invention, all nodes have synchronized timing accurate to within about 100 milliseconds to permit coordinating of certain actions, such as transmission of the periodic topology update information. Further, each node or satellite can determine the locations of all other nodes in its island in order to determine its line of sight neighbors This position determination is aided through the periodic topology update information.

The network of nodes may become partitioned or fragmented in a stressed environment, with the result that it consists of multiple islands with no communication between islands.

The algorithm of the present invention is able to work with any scheme that permits the acquisition of lost nodes. However it provides direct support for a specific model of island joining. This scheme supposes that every node contains L identical ports, any one of which may be used in a scanning mode to search for disconnected nodes. The search may be either directed, using ephemeris information, or undirected if this information is not available. In later sections of this disclosure, in which a specific reduction to practice is detailed by way of an example, it is assumed that a node will generally attempt to maintain one free port for this purpose and for implementing link changes. However, this is just one particular approach to node acquisition and the remainder of the algorithm is not dependent on this choice.

A goal of the algorithm is to maintain a network that is sufficiently robust, i.e. has a plurality of redundant paths between all pairs of nodes, so that it is rarely necessary to acquire lost nodes.

Data is transmitted between nodes by a packet communication technique in which discrete packets of data are transmitted from a sending node to a receiving node, perhaps passing through one or more intermediate nodes which relay the packet. In addition to data, each packet includes header information which identifies the receiving node and the packet length, among other things. Topology updating information is transmitted in separate packets which for example might be initiated by a periodic timer. The headers of these packets identify these packets as topology information rather than as data.

BRIEF DESCRIPTION OF THE DRAWINGS

These and other aspects and advantages of the present invention are more apparent in the following detailed description and claims, particularly when considered in conjunction with the accompanying drawings. In the drawings:

FIG. 6 sets forth various equations useful in an understanding of the invention;

FIG. 11 lists a further processing step in accordance with the present invention.

DETAILED DESCRIPTION OF PREFERRED EMBODIMENTS

The present invention resides primarily in the adaptive link assignment system and process for the member nodes of a multinode communication network employing conventional communications circuits and components, and not in the particular detailed configurations thereof. Accordingly, the structure, control and arrangement of conventional circuits and components are illustrated in the drawings by readily understood block diagrams which show only those specific details that are pertinent to the present invention, thus not obscuring the disclosure of the present invention with structural details which are readily apparent to those skilled in the art having the benefit of the description herein. Thus, the block diagram of illustrations of the figures do not necessarily represent the mechanical structural arrangements of the exemplary system but are primarily intended to illustrate the major structural components of this system in a convenient functional grouping, whereby the present invention may be more readily understood.

To provide an illustrative example in the description to follow, the communications environment to which the present invention is applied is described as a satellite communications system comprised of a plurality of communications satellites interlinked with one another and with a plurality of associated ground stations. However, it should be realized that the invention is not limited to use with satellite communications or with this particular network, but is applicable to any multinode network in which communications between source and destination nodes may take place over multiple paths through the nodes of the network. It should also be noted that the network topology can be either dynamic, changing with time, or static, effectively time invariant The present invention is particularly advantageous when incorporated in the communications network where the network topology is dynamic, for example with multiple moving vehicles such as aircraft, spacecraft, ships, or land vehicles, and where the various communications stations or nodes, the distances between nodes, and the communications paths between nodes may vary with time, consequently requiring real time effective tracking of changes in the network topology.

Figure 1:
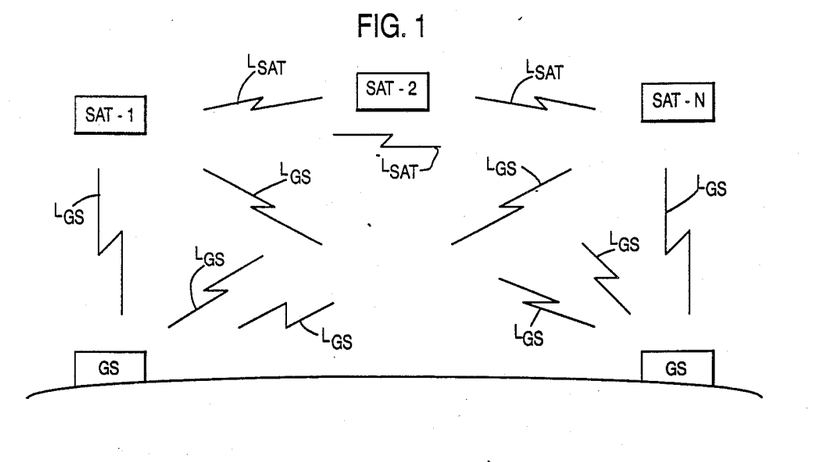
FIG. 1 diagrammatically illustrates a multinode satellite communications network comprised of a plurality of communications satellites interlinked with one another and with a plurality of associated ground stations.

In the satellite communications network diagrammatically illustrated in FIG. 1, a plurality of geographically distributed terrestrial or ground stations GS communicate with one another by means of a multiplicity of communications satellites SAT via respective ground to satellite or satellite to ground communications paths Lgs and satellite to satellite communication paths Lsat. Ground stations GS and satellites SAT correspond to the network nodes which are linked to one another via transmission paths Lgs and Lsat. Each node, whether a ground station GS or satellites SAT, contains conventional transceiver, tracking, acquisition, and signal processing equipment, as shown in block diagram form in FIG. 2.

Figure 2:
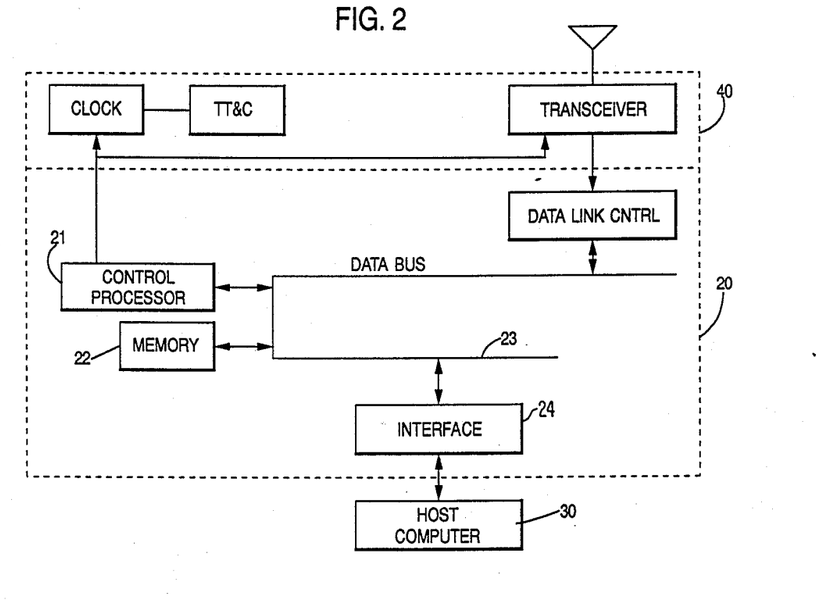
FIG. 2 is a block diagram illustration of the communication and digital processing equipment at an individual node, whether a ground station or a communications satellite, of the communication network of FIG. 1.
Figure 2:
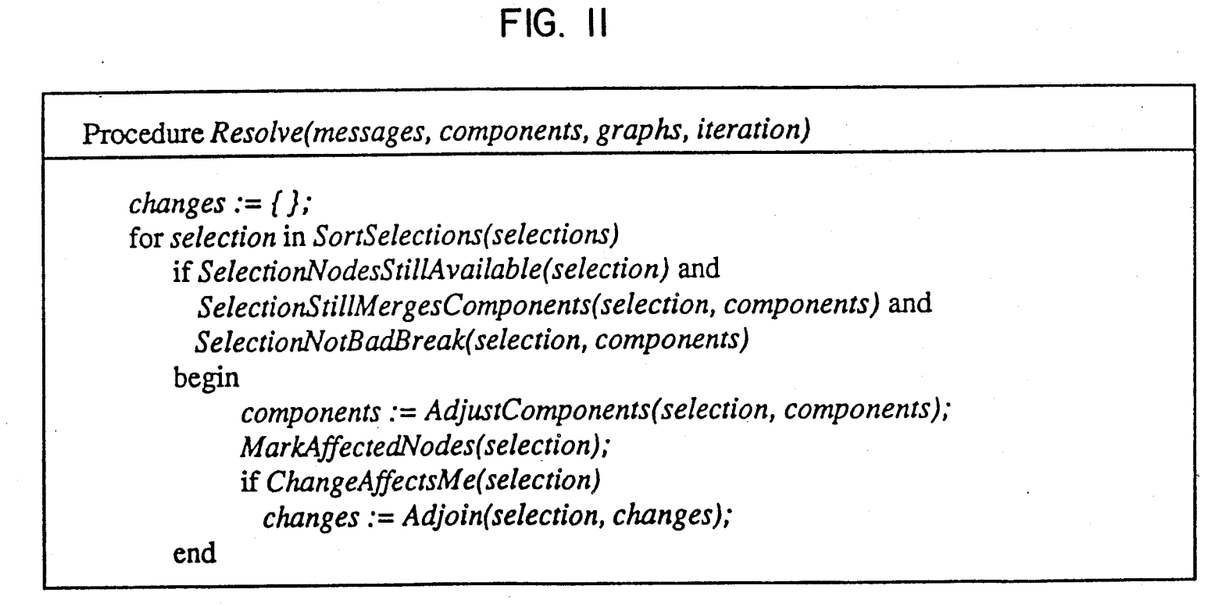

The typical node depicted in FIG. 2 includes a packet switch 20 which has a communications bus 23 that communicates through an interface unit 24 to a host computer 30. Computer 30 executes the various user processes and is the source or destination of all user data. Packet switch 20 sends data packets from host computer 30 to other nodes, delivers data packets to computer 30, or relays packets to other nodes. Packet communication is typically done with use of a set of layered protocols similar to the seven layer International Standards Organization Reference Model of Open System Interconnection. In the node of FIG. 2, data link control is a low level function of layer 2 of the International Standards Organization Reference Model and provides error free transmission of packets. The data link control may be implemented using a standard synchronous data link communication protocol. For a more detailed explanation of this seven layer model, as well as a number of standard protocols that may be employed in accordance with the present invention, attention is directed to the above-mentioned book *Computer Networks*.

Control processor 21 within packet switch 20 provides basic control of the packet and may be a general purpose computer. Control processor 21 is primarily responsible for executing the network layer, or layer 3, protocols. The network layer is a layer in which the link assignments are determined. The adaptive link assignment algorithm of the present invention is executed by control processor 21.

Associated with control processor 21 is a random access memory 22 in which the packet buffers, control software, and link assignment tables reside Memory 22 provides temporary storage for packets while control processor 21 is deciding whether to transmit the packet to another node, to deliver the packet to host computer 30, or to relay a received packet to another node. Such decision is based upon the address in the packet header. The packet routes available to other nodes depend upon link assignments which are updated periodically.

FIG. 2 also shows conventional satellite communications equipment which makes up the physical layer, or layer 1, of the node, in the form of a transceiver unit 40 which contains transmitter, receiver, modulator and demodulator units, tracking telemetry and control units, and a clock. These units interface with the packet switch through conventional data link control components. The details of the configuration and operation of such equipment are unnecessary for an understanding of the present invention, and so such details are not set out herein. For further information with regard to such, attention is directed to standard communication texts such as *Digital Communications by Satellite*, by J. J. Spilker, Prentice Hall, 1977.

Carrier and bit synchronization may be accomplished using conventional mechanisms, such as described in the article "Carrier and Bit Synchronization in Data Communication —A Tutorial Review," by L. E. Franks, *IEEE Transactions on Communications*, Vol. COM-28, August 1980, pages 1107-1121. Precise timing of node operations may be implemented using techniques such as described in the articles "Network Timing/Synchronization For Defense Communications," by H. A. Stover, pages 1234-1244 and "Synchronization of A Digital Network," by J. Heymen, et al., pages 1285-1290, *IEEE Transactions on Communications*, Vol. COM-28, August 1980.

Figure 3:
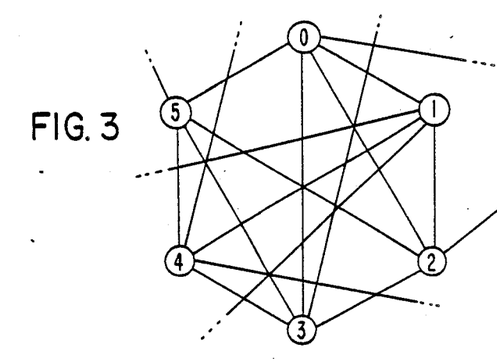
FIG. 3 is a two dimensional topology diagram of an exemplary multinode communication network.

FIG. 3 illustrates a network having 6 nodes, designated 0-5. Any network or island is named in accordance with the lowest node number within that network or island. Thus, the network of FIG. 3 can be named network 0. Each node within network 0 of FIG. 3 has a plurality of communication ports, illustratively depicted in FIG. 3 as five ports for each node and so is capable of simultaneous communication over a plurality of communication links. Thus, for example, node 0 has a communication link established with each of node 1, node 2, node 3, and node 5, and has an additional communication port available for use in a search mode. Similarly, nodes 2, 3, and 5 of FIG. 3 each have four established communication ports and one port used in a search mode. Each of nodes 1 and 4 has three established communication links and one port used in a search mode, leaving each of these two nodes with a free port.

The degree of connectivity or robustness of a graph topology is determined by the number of disjoint paths between all pairs of nodes in the graph. There are two forms of disjointness. The less stringent of the two is link disjointness. Two paths from node A to node B are link disjoint if they do not have a common link. Two paths are node-disjoint if they do not have a node in common. Two paths that are node disjoint are clearly also link disjoint. The major concern during each topology update is whether line-ofsight outages are about to split the network into disjoint islands. In general, the network is sufficiently robust that this is extremely unlikely. However, if this situation has been detected, all the nodes take whatever action may be necessary to prevent the separation. Two link-disjoint paths between all pairs of nodes in a graph are required to guarantee that no single path failure will separate the graph into islands. Similarly, two node-disjoint paths between all pairs of nodes are required to guarantee that no single node failure will separate the graph into two islands.

A graph is biconnected if there are at least two node. disjoint paths between every pair of nodes. Similarly, a graph is triconnected if there are at least three node-disjoint paths between every pair of nodes.

Figure 4:
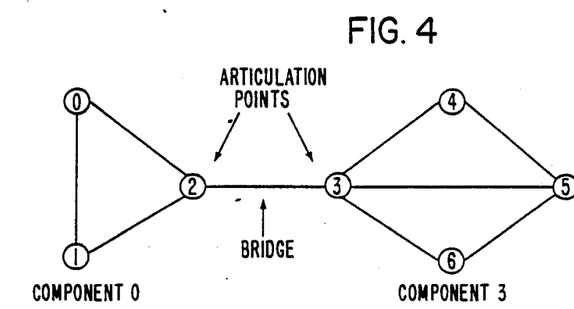
FIGS. 4 and 5 are graphical representations of communication networks helpful in understanding of the present invention.

Important features of a non-biconnected graph are the sets of biconnected nodes, the articulation points (or separation points), and the bridges. The nodes of a non-biconnected graph may be collected into biconnected components. The successive merging of these components creates a biconnected graph. FIG. 4 shows a non-biconnected graph with two biconnected components, named component 0 and component 3. The bridge between biconnected components and the articulation points at each end of the bridge represent the critical link and nodes, respectively, any of which will separate the graph into two or more components if removed.

A simple algorithm is set forth in "Depth-first Search and Linear Graph Algorithms" by R. Tarjan, published in *SIAM J. Computing*, Vol. 1, June 1972, pp. 146-160, the disclosure of which is incorporated herein by reference. This algorithm uses a depth-first search through a graph to find sets of biconnected components, sets of articulation points, and sets of bridges of a connected graph, doing so in on the order of (n+e) time, where n is the number of vertices and e is the number of edges. This information is required to improve the robustness of the graph without a lengthy search process. From this information it can be seen that the graph of FIG. 4 can be made biconnected by adding a link from any node in component 0 to any node in component 3, except for the articulation points. Thus, for example, a link from node 0 to node 4 will make the entire graph biconnected. In accordance with the present invention, a high priority is assigned to creating at least a biconnected network using this algorithm to direct the critical additions.

Figure 5:
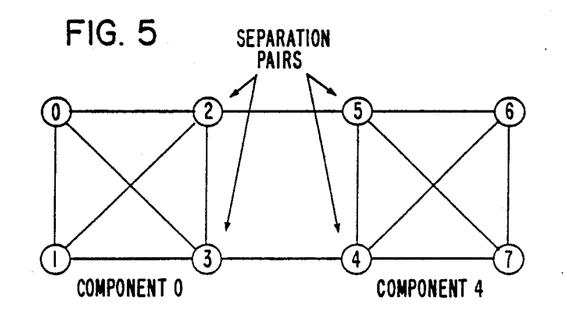

Once this has been done a considerably more complicated algorithm is used in a similar fashion to produce a triconnected network. The algorithm is discussed in "Dividing a Graph into Triconnected Components," by J. E. Hopcroft and R. E. Tarjan, published in *SIAM J. Computing*, Vol. 2, September 1973, pp. 135-158, the disclosure of which is incorporated herein by reference. This algorithm also uses a depth-first search and runs in on the order of (n+e) time. The algorithm finds triconnected components and separation pairs A separation pair is a pair of nodes which, if removed from the graph, will partition the graph into two or more components. Thus, the graph of FIG. 5 is biconnected, but it has triconnected components. In this example the separation pairs are (2, 3) and (4, 5), and the triconnected components are (0, 1, 2, 3) and (4, 5, 6, 7). These algorithms can be used to rapidly improve a graph's connectivity; however, it appears to be impractical to generalize this approach to higher levels of connectivity. Beyond this level of connectivity more compute intensive algorithms are necessary in order to improve network robustness, and, generally, a triconnected network is considered adequately robust.

If more than one new link is available to provide an improved level of connectivity, various "tie breakers" are available. The following discussion will focus on two particular metrics that will tend to lead to improved network topologies. However, the invention disclosed does not depend on the precise formulation of these heuristics. Other metrics that capture important characteristics of a network may be accommodated.

In any network, some potential paths will have LOS visibility for a longer period of time than others. It is important that the topology have enduring connectivity, and so links with a long-term LOS visibility are more valuable than links with only short-term visibility. Let $T^{LOS}_{ij}$ be the length of time that nodes i and j will have LOS visibility. This number can range from 0 to ∞ depending on orbital parameters of the nodes. In order to establish a new link, there is an acquisition overhead (which is a function of the link technology) that can help to define a lower limit $T^{LOS}_{min}$ for LOS visibility below which it is not useful to establish a new link. Likewise, there is an upper limit $T^{LOS}_{max}$ beyond which all LOS endurance can be considered equivalent. One way in which the quality of the endurance of the LOS visibility can be rated is the following link durability measure, having four categories:

| Q LOS | Endurance | | |
|---|---|---|---|
| 1 | $T_{min}^{LOS}$ | $<T_{ij}^{LOS}$ | $<T_{max/16}^{LOS}$ |
| 2 | $T_{max/16}^{LOS}$ | $<T_{ij}^{LOS}$ | $<T_{max/4}^{LOS}$ |
| 3 | $T_{max/4}^{LOS}$ | $<T_{ij}^{LOS}$ | $<T_{max}^{LOS}$ |
| 4 | $T_{ij}^{LOS}$ | $<T_{max}^{LOS}$ | |

Any potential link (i-j) having $T^{LOS}_{ij} < T^{LOS}_{min}$ is automatically rejected. This quality measure can be used as a tie-breaker for competing connections that might otherwise provide equivalent connectivity.

The above link connectivity metric is based entirely on the distribution of node-disjoint paths. While this permits the construction of a network that is tolerant of failures, it is clear that the link assignment algorithm should also make changes to respond to dynamic changes in traffic requirements. A delay metric can be combined with the connectivity metric to create an overall topology metric by which to judge the network.

A representative delay metric may be computed using only traffic data available at each node. In particular, the calculation at each node is based solely on the traffic sourced at that node and on traffic forwarded or relayed through the node. Thus, the node considers the effect on delay of all traffic transmitted by it This allows a node to determine the approximate effect of link assignment decisions made by it on average packet delay. The link metric to be used for link (m,k) is denoted by $D^{mk}_{(fmk)}$. This value reflects propagation, transmission, and queueing delays.

The link assignment algorithm is used with an adaptive routing algorithm in order to provide robust data delivery. Adaptation of routing tables is done in response to changes in traffic loads and topological changes. The link assignment algorithm does not attempt to respond as quickly to changes in traffic patterns as does the adaptive routing algorithm, because modifications to the topology are more difficult than changes to routing.

Figure 61:
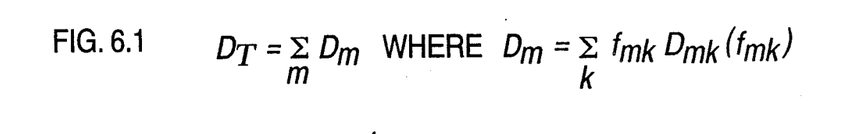

The goal is to minimize as closely as possible the total delay in the network, i.e. to minimize the value $D_t$ as computed by the equation of FIG. 6.1. However, a node cannot do this directly and exactly because the node does not have the global information required to compute $D_m$ at other nodes in the island. Instead, the effects on the network of flow transmitted from the node are directly modelled. Any node m evaluates its impact on $D_t$ by constructing a minimum cost spanning tree from node m.

Figure 62:
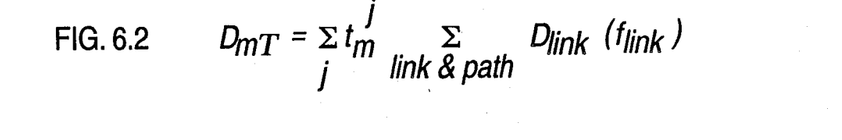

Let $f_{ik}$ be the long term average flow on link (i,k), and let $\tilde{v}_m$ be the total long term average traffic at node m for destination node j, including both the traffic sourced at node m and the traffic relayed or forwarded by it. The shortest path spanning tree from node m is generated using an algorithm set forth in "A Note on Two Problems in Connection with Graphs," by E. Dijkstra, *Numer. Math.*, Vol. 1, pp. 269-271, 1959. Then the value $D_{mT}$ is computed using the equation of FIG. 6.2 which weights the routing tree by the amount of traffic $T_{jm}$ at node m for all destinations Note that by including $T_{jm}$ as a weighing term, this metric favors topologies in which there are direct connections from node m to the destinations with the largest amount of traffic. After computing this metric for the current topology, $D^{new}_{mT}$ is found using new minimum cost spanning trees. The improvement is given by:

$$\Delta D_{mT} = D_{mT} - D_{mT}^{new}.$$

If $\Delta D_{mT}$ is positive, then the change reduces the delay, and the ability of the network to carry the traffic is improved. When a link is added from node m to node j, it must be given a fictitious traffic flow for the purposes of this calculation. The link utilization is set equal to the average link utilization on the other links from node m.

When the network is relatively weakly connected, the connectivity algorithms direct the changes to improve connectivity, with tie-breakers based on the LOS durability and the delay metric. The potential connection with the highest link durability metric, $Q^{LOS}_{ij}$, is chosen. In case there are multiple link in the same class, the link with the best delay metric improvement is selected. This strategy emphasizes improving connectivity so long as the network is less than tri-connected.

Once the island becomes triconnected, the algorithm gives more emphasis to improving delay. This is done with a combined metric that reflects both delay and connectivity. The connectivity metric used is the distribution of link-disjoint paths. Because of the difference in units of the two metrics, they are normalized to provide the fractional change prior to combination. The overall strategy is, thus, that when the network is single connected, emphasis is given to establishing new paths that make the network biconnected, with LOS endurance and delay used as tie breakers; when the network is biconnected, emphasis is given to making the network triconnected, with LOS endurance and delay again used as tie breakers; and when the network is triconnected, emphasis is given equally to improving distribution, LOS endurance, and delay.

Figure 63:
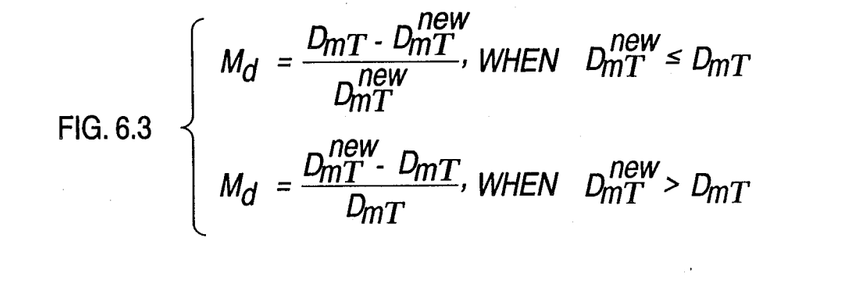

When the network is triconnected, the metrics can be combined by summing the normalized fractional improvement of each metric. The fractional change in the delay metric is defined by the equations of FIG. 6.3.

Figure 64:
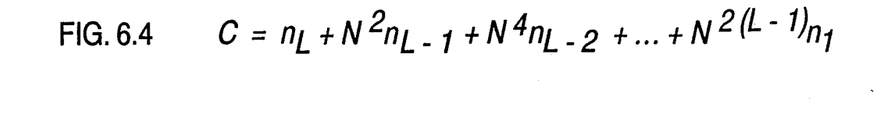

The connectivity metric computes the number of pairs of nodes with single link-disjoint paths, the number with double link-disjoint paths, the number with triple link-disjoint paths and so on. This information is used to form an integer. Where there are L ports at each node, N node pairs used to compute the metric, and nj node pairs with j link-disjoint paths, the integer is calculated with the formula of FIG. 6.4. The choice of $N^2$, $N^4$, etc. for coefficients provides a large change in C if the connectivity changes from (L-j)-connected to (L+1-j)connected. Smaller values of C are preferred, just as for delay D. The number of disjoint paths between all pairs of nodes may be computed using one of the max-flow min-cut algorithms such as the Dinic algorithm as set forth in the text Computer Networks by A. S. Tanenbaum. Prentice Hall, 1981, pp 44 to 52, the disclosure of which is incorporated herein by reference.

As before, let C be the connectivity of the baseline topology and let $C_{new}$ be the connectivity of the modified network. The normalized fractional change is, then:

$$M_c = \frac{C - C_{new}}{NC}, \text{ when } C_{new} \leq C, \text{ and}$$

$$M_c = \frac{C_{new} - C}{NC}, \text{ when } C_{new} > C.$$

The N in the denominator scales the calculation appropriately relative to delay. Improving the network from being (d-1) connected to being d connected is worth about a factor of 2 in delay.

Figure 65:
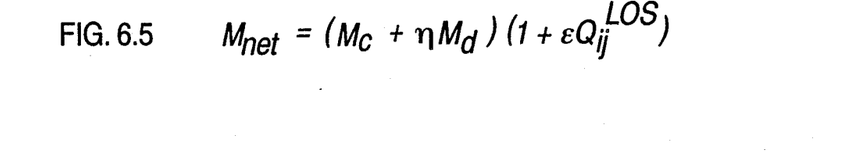

A change breaking a link and adding a new link is accepted if the total change in the value $M_{net}$, as computed by the equation of FIG. 6.5, exceeds some threshold $\Delta$. The parameter $\eta$ allows changes in the emphasis between optimizing connectivity and optimizing delay. The parameter $\epsilon$ allows emphasing the link durability. For changes that are simply link additions without any breaks, changes are accepted with a lower tolerance.

The adaptive link assignment algorithm consists of two decoupled activities, namely node acquisition and improving connectivity, that run in parallel. In the following discussion, several of the top-level routines are presented in a pseudo-Pascal syntax. Declarations have been removed and artificial control structures have been introduced in the interests of conciseness. These routines refer to a number of global variables that capture the state of the link assignment algorithm.

A major goal of the algorithm is to collect all the nodes into a single graph. This may be done using a search link, as previously discussed. When a node is acquired, the link that located it is assigned to make the link connection. A new search link can be established using the algorithm described below. A unique number in the range 0 to N 1, where N is the number of nodes in the island, is assigned to every node. This value is used in conjunction with an iteration counter to assign rotating priorities to each node. A small amount of arbitration must occur to reassign node numbers, align iteration counters, and so on.

Figure 7:
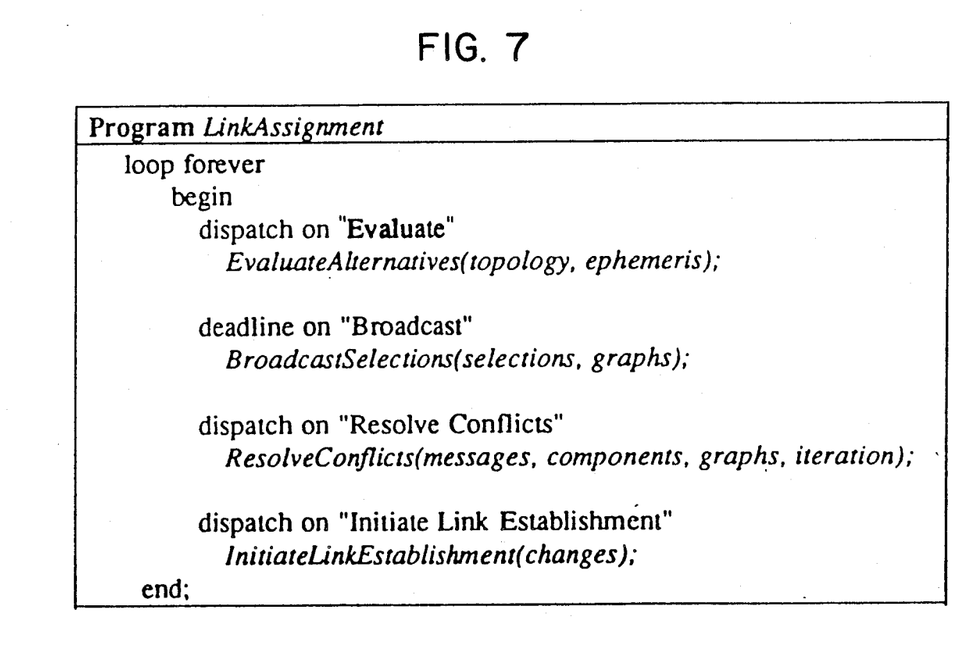
FIGS. 7 and 8 list processing steps of heuristic procedures used in accordance with the present invention.

The connectivity improvement algorithm is run once per topology update cycle. It consists of four loosely coupled subframes: Evaluate Alternatives, Broadcast Selections, Resolve Conflict, and Initiate Link Establishment, as shown in FIG. 7. "Dispatch on" indicates that the arrival of the specified timer signal should cause the associated procedure to run. During the Evaluate Alternatives subframe, each node analyzes the current topology and determines what changes it should make to improve the island's metric. These changes are broadcast to all of the nodes in the island in the following subframe. This may occur as soon as the selections have been determined, but it must happen by the set deadline. This is indicated by Deadline On "Broadcast." The selections are developed in an incremental fashion to provide the best estimate for a set of offers to be broadcast in the event evaluation must be halted prematurely. It is likely that a number of the selections will compete for the same resource These problems are detected and resolved during the Resolve Conflicts subframe. Finally, the process of acquiring any new paths is initiated in the Initiate Link Establishment subframe. This may take several iterations.

There is only one message transaction per iteration. This is important since propagation delays may represent a significant portion of the total frame time. This feature is supported by the complete topology information available at every node and the use of deterministic conflict resolution algorithms. Knowledge of the topology, the transmitted selections, and the current priorities enables every node to correctly anticipate the final actions of every other node without a separate acknowledge cycle. This technique is thus called "implicit acknowledgement."

The organization is sufficiently flexible to permit a range of implementation approaches within each subframe. In particular, the Evaluate Alternatives subframe can be almost arbitrarily complex. In a simple implementation, every node offers to make the "obvious" change to respond to problems in the graph. For example, if predictable LOS failures threaten to split the graph into two disjoint components, then every node in each component would attempt to add a link to a node in the other component. Of course, it is only necessary to add one link in order to ensure that the graph remains connected and just two links to make it biconnected. Thus, in the conflict resolution stage, most of the offers are disregarded, resulting in lost potential improvements. One can employ more sophisticated algorithms incorporating lookahead to anticipate which links should be utilized to connect the components and then reanalyze the graph on the assumption that these links will be provided.

The Evaluate Alternatives subframe is used to perform the required analysis of the current graph. The action of each node is determined by its resources and the configuration of the current graph. A node may have a number of spare ports, it may be using all its ports except for the search port, or even its search port may be in use. In a similar way, the graph is in one of four easily distinguished states; it may be in immediate risk of splintering, it may be less than biconnected, less than triconnected, or it may be triconnected. As discussed above, every node knows which nodes have links to each other, which are in LOS, and for how much longer.

If the graph is in danger of fracturing and a node does not have a search port, the node attempts to break one of its links and considers offering it to every node in every other island. If the node has a search port then it considers adding a link to every node in every island. If it has one or more free ports in addition to the search port, and there are multiple islands, a very rare case, it will be willing to add several links in a single iteration if no other nodes are in a position to provide necessary links.

If the graph is connected but is less than biconnected then nodes without a search port are permitted to attempt to find an acceptable deletion to reestablish this port. However such a deletion will not be approved if it creates additional biconnected components or, worse yet, splits the island. Nodes with just a search port offer to use it to merge components but such offers will be accorded a low priority. Finally, nodes with free ports attempt to improve the connectivity.

If the graph is biconnected or triconnected then nodes without a search port attempt to obtain one as before, nodes with a search port consider rearrangements of their links, and nodes with free ports try to make useful additions. If a node is rearranging its links, then the network metric must be considerably improved to justify the disruption. If the graph is not triconnected then the additions will seek to merge the components; otherwise more general changes are considered Nodes without a search port attempt to restore the port by finding a deletion that does not damage the graph too seriously. If there are several possible deletions, then the least damaging one is selected. Such a node normally marks the link as though it is about to lose line-of-sight and then waits several iterations before severing the link. This permits the adaptive routing algorithm, for example, to make adjustments in the routing table to eliminate traffic from this path prior to disconnecting it. An exception to this occurs when it is necessary to make an immediate change to avoid graph fragmentation. If this node's link is the most desirable offer to avoid fracturing, then the path is deleted immediately.

If all of the ports except the search port are in use, the node generally considers rearrangements of its primary links to improve the graph metric. Such a change is accepted only if it provides a significant improvement in the metric. In these cases, the search port is used to make the addition and the link to be deleted is marked as though it were losing LOS. However if the graph is not biconnected, the search port is offered to improve the connectivity. It will be recovered during later iterations.

Finally nodes with free ports, in addition to the search port, attempt to add a port as required. Although many nodes may offer to make a change to solve a particular problem, only one of the solutions is selected after the Evaluate Alternative subframe.

The algorithm strikes a balance between making changes in a timely manner and making so many alterations in a single iteration that the metric evaluations that justify a change become meaningless. This is done by generally limiting each node to making just one change per iteration. However, because of potential conflicts between decisions, a node may issue several offers each iteration. These offers are broadcast to all the nodes in the graph, and the best changes are selected. Each offer states the problem it is addressing and the associated metric. The best changes are selected by sorting the offers and removing redundant ones.

There are four levels of connectivity that can be easily determined using the current algorithms: imminent loss of connectivity, connected, biconnected, and triconnected. The goal of the algorithm is to improve the connectivity by one level per iteration until the graph is triconnected and then to make general changes to adapt to fluctuating traffic requirements.

With the exception of one special case, a node investigates just those changes in which it will be directly involved and that require one addition and/or deletion. In cases in which there are many such alternatives, simple criteria are used to form a preliminary ordering of the choices, and then the network metric is used to incremental establish a more accurate ordering. During this analysis the node does not consider how its changes will interact with decisions being made by other nodes. It is possible that an apparently desirable change will not seem so attractive once some other selection is implemented. This is inevitable since performing an accurate analysis of the interactions might require a substantial amount of lookahead and backtracking, and this accounts for the reluctance to make too many actions during a single iteration.

Figure 8:
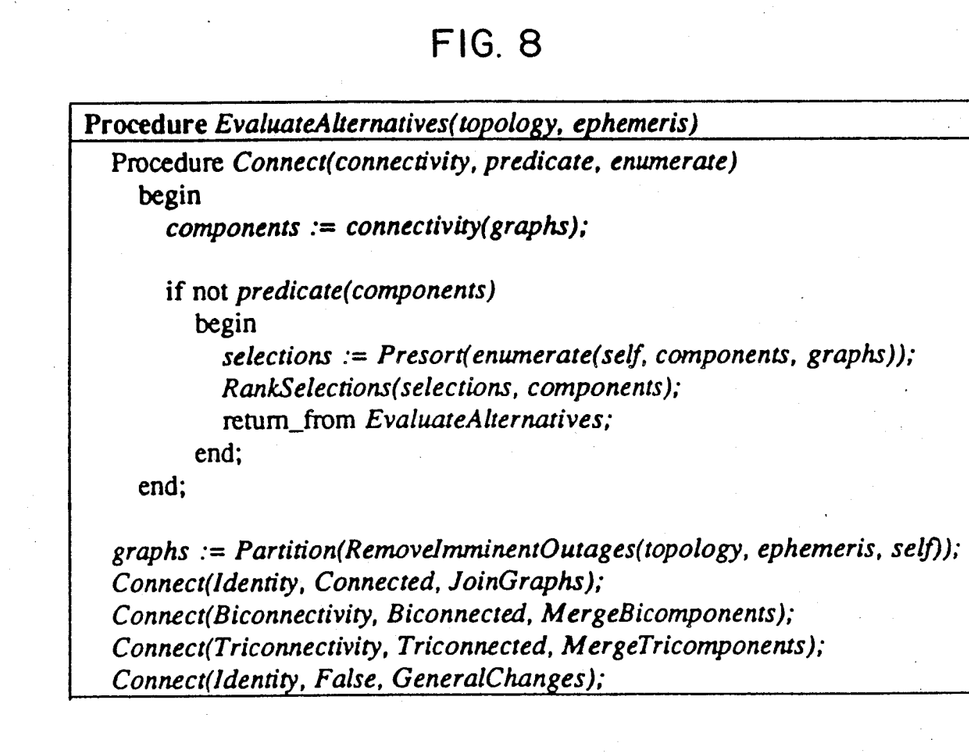

To clarify the issues presented here, FIG. 8 presents the overall flow chart for control in the Evaluate Alternative subframe. Note that this is merely one implementation of the scheme described within this disclosure. Four classes of actions are considered during every iteration: determining whether the graph is in danger of splintering, adding paths to merge biconnected components, adding paths to merge triconnected components, and general changes for well connected graphs.

This procedure uses a programming style, namely procedural abstraction, that it not commonly encountered in Pascal programs and which may appear a little confusing at first. It is observed that the flow of control is essentially the same at all four levels of connectivity and that the only differences are in the procedures used to analyze the topology and to determine whether it is appropriate to take a particular class of action, and to determining the manner in which the potential changes are found. This common pattern of usage is captured within the subprocedure"Connect()," set out in FIG. 8. The three arguments to this procedure are themselves procedures. The first argument performs the required connectivity analysis, the second one tests the current connectivity, and the final one generates the set of possible changes. This set of changes is sorted once using coarse criteria and is then sorted more carefully using the network metric. An invocation of "Connect()" is quite easily understood if one mentally substitutes the names of the procedures for their corresponding use within the procedure. Recall that control may return from "EvaluateAlternatives()" after he completion of the required work or when the allotted time interval is exceeded.

The main result of this procedure, a set of selections, is returned in the external variable "selections." Two further values are computed that are used in later subframes. These are stored in the external variables "graphs" and "components." The first contains the set of connected graphs and the second stores the components at the current level of interest The procedure "Identity()" simply returns its single argument, a set of connected graphs, while "Biconnectivity()" and "Triconnectivity()" return the biconnected components and triconnected components of the graph respectively. "Connected()" returns true if there is a single connected graph. "Biconnected()" and "Triconnected()" return true if the network is biconnected or triconnected respectively, and "False()" always returns false. Here it is assumed that case matters in identifier names. The remaining four functions generate sets of possible changes and are discussed below.

The procedure "RemoveImminentOutages()" uses the topology and ephemeris information to create a representation of the current network. Links that are expecting line-of-sight outages are not included. The variable "self" is passed by reference so that it can be assigned to the data structure that represents the current node. This set of nodes is partitioned into a set of one or more disjoint graphs, and the result is stored in the external variable "graphs." The procedure "Connect()" is then called to examine the four levels of connectivity.

"JoinGraphs()" enumerates the allowable selections. In this case it has been determined that the network is in danger of fragmenting, and so each node considers additions to every node in every disjoint graph. If the node does not have a spare port, it attempts to break one of its links, subject to the constraint that a deletion will not create a new biconnected component within its subgraph.

If the graph is not at risk of fragmentation but is not biconnected, then links must be added between pairs of components to remove bridges. The importance of this action is sufficient to justify nodes with just their search port free using that for a connection. However, nodes with all their ports in use are not required to break a path. Instead, those nodes calmly seek a deletion that restores the search port As before, a deletion is not considered if it creates a new biconnected or less component. These offers are analyzed during the Resolve Conflicts subframe, and the best set is chosen.

Figure 9:
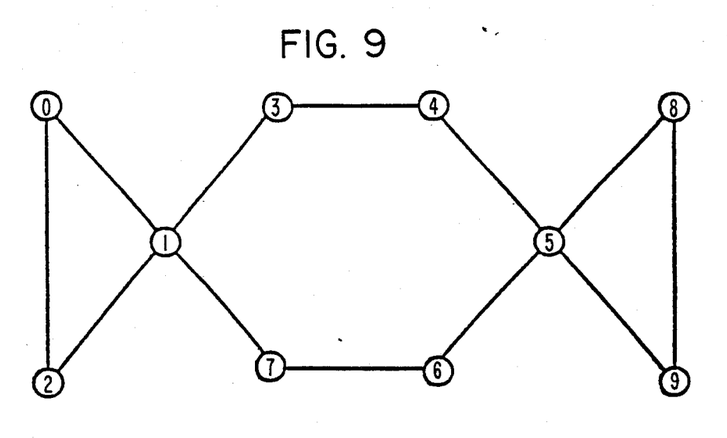
FIG. 9 is another graphical representation, similar to FIGS. 4 and 5.

When there are multiple components, there may be preferred components to merge In FIG. 9 it can be seen that nodes in component 0 would prefer to add a link to nodes in component 5, as this will remove two bridges in one step, while nodes in component 1 will equally prefer components 0 and 5. This situation presents several opportunities for added sophistication. Since it is preferable for a link to be added between components 0 and 5, there is little to be gained by having nodes in component 1 make an offer In fact, given sufficient computing resources it is possible to determine exactly which pair of nodes in components 0 and 5 should join and then to make decisions moving directly towards triconnectivity during the current iteration. This desire is motivated by the recognition that in the example just presented it would be inadvisable to do more than add a single link without additional analysis.

If the graph is at least biconnected, the triconnected components algorithm is executed to determine whether it is also triconnected. This algorithm is more complicated than the previous one but its asymptotic time complexity is also in the order of (n+e). If there are triconnected components then "MergeTricomponents()" is called to compute the set of possible changes. This function is much like "MergeBicomponents()" except that nodes with only the search port free must find an acceptable replacement port before volunteering the search port. Such rearrangements require that the new metric be substantially better than the current metric.

Once the network is at least triconnected, the combined metric is used to direct changes through the procedure "GeneralChanges()." Nodes with free ports attempt to add links to other nodes with spare ports, nodes with just the search link free consider rearrangements of their primary links, and those without a search port attempt to free one of their ports.

Figure 10:
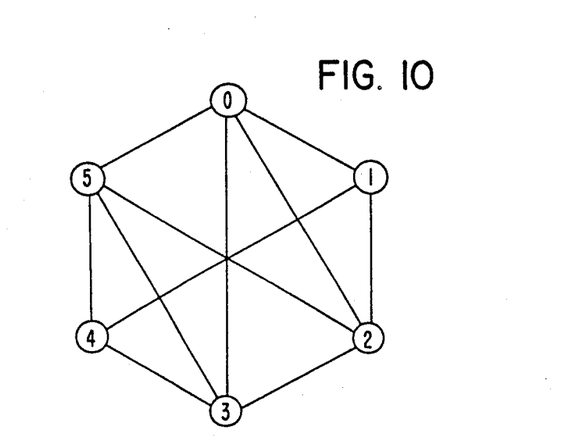
FIG. 10 is another two dimensional topology diagram of a multinode communication network.

If a node has free ports but cannot find any additions to make, then the graph may have settled into a local maxima with respect to connectivity. Ignoring dynamic changes, it is necessary to provide deletions and additions among distant nodes in order to improve the connectivity further. Consider the graph of FIG. 10 in which every node has four primary ports and all nodes are in LOS, and the graph is triconnected. It can be seen that nodes 1 and 4 are using only three of their ports but that they are already connected to each other. The graph can only become fully connected by permitting a node to command a deletion between two other nodes. For example, if the link between 0 and 3 is broken, then it becomes possible to obtain a maximally connected graph by adding links between 0 and 4 and between 1 and 3. In general, nodes are not permitted to exert this much control over the graph, as it is too expensive to evaluate all the possible combinations. However, it is very easy to recognize this special case when it does happen and then to take appropriate action. A node attempting this change commands the deletion and both additions. It is possible that other nodes have useful changes to make even if the current node requires a change of this sort to fully utilize its ports.

The possible changes are resorted in "Presort()" (FIG. 8) to enhance the likelihood that the best solutions will be found in the time permitted. A selection cannot be transmitted based only on the initial ranking; it must have been analyzed formally to be a candidate for broadcasting. In this step changes that are likely to balance the number of free ports at each node are preferred, then those that result in persistent links, and finally those that connect the node to those neighbors for which the greatest amount of traffic is being either generated or forwarded.

Once the possible changes have been presorted, the network metric is used in "RankSelections()" to refine the ordering. The initial ranking is used to ensure that the most sensible changes will be evaluated formally before the time for this slot is overrun. However, a selection cannot be transmitted unless it has been validated by this routine. In general, there may be several sets of equally important changes to make; e.g., several biconnected components to be merged. Metrics are evaluated for each set in round robin fashion computing a metric for one selection in each set, inserting it in the appropriate position, and proceeding to the next set. This is continued until all the selections in every set have been sorted.

The Broadcast selections subframe is used to transmit the selections to all the other nodes in the island. This is done using a flood mechanism to ensure reliable delivery. A message must indicate the type of change being commanded and the source of the message. It may specify a deletion, up to two additions, and a network metric.

A key aspect of the new algorithm is the elimination of a separate acknowledge phase. Since every node receives the same topology messages and set of selections they can all deterministically arrive at the same conclusions regarding which changes should be approved. Every selection includes a network metric that indicates the level of connectivity achieved by the change, the relative importance of the type of change (e.g. break vs add/break), a measure of the connectivity, the longevity of a link addition, and the delay metric. These last three measures are combined in different ways depending on the current level of connectivity. To ensure that competing selections can be resolved correctly it is necessary to include additional information to guarantee that they are labeled uniquely. Every node is assigned a rotating priority that is included in each transmitted packet. Finally a counter is included to distinguish the selections from a given node still further.

Resolving conflicts is relatively simple and is shown in FIG. 11. The received selections are sorted according to the network metric included in each selection and are then processed in order. In general a node may make at most one addition and/or one deletion. As such selection is accepted, the affected nodes are marked appropriately. If the selection makes an addition and the graph is not triconnected or if the selection makes a deletion then the components are recomputed. Typically there will be many selections that attempt to achieve the same effect. For example two biconnected components may be merged by a single link addition and all other offers should be discarded. Before a selection is accepted it is determined whether it attempts to join two components that have already been merged. Similarly a selection that proposes a link deletion must be checked against the database to determine whether it, in connection with other selections that have already been approved for the current iteration, will split the island or introduce new biconnected components The execution of ResolveConflects() may determine that the current node must make one or more changes. If the change calls for a deletion then the relevant link is typically marked as though it is about to experience a conventional link outage However if the island is in danger of fragmenting, the deletion must occur immediately.

Although the present invention has been described with reference to preferred embodiments, various changes and rearrangements could be made, and still the result would be within the scope of the invention.

What is claimed is:

1. For use in a multinode communication graph including a plurality of communication nodes and having a known graph topology with each node a part of a component, each component made up of a number of nodes between one and the full number of nodes in the graph, each node having a plurality of communication ports, each port capable of establishing a communication link with a communication port of another node, a method of assigning ports to communication links to maintain the connectivity of the graph, said method comprising within any one node the steps of:

(a) analyzing the current graph topology to determine the current graph connectivity state;

(b) determining the available changes said one node is capable of making to improve the graph connectivity;

(c) broadcasting a description of the determined changes to other nodes in the graph;

(d) receiving from other nodes in the graph broadcasts of descriptions of changes determined by the other nodes to be available to such other n odes to improve the graph connectivity;

(e) resolving conflicts between link assignments in the determined changes of all nodes in the graph to determine a new link assignment for said one node; and (f) initiating establishment of a new communication path with another node in accordance with the determined new link assignment.

2. A method as claimed in claim 1 wherein the step of analyzing the current graph topology comprises the steps of:

(i) identifying components within the graph which are at least triconnected with other components of the graph;

(ii) identifying components within the graph which are less than triconnected with other components of the graph; and (iii) identifying components within the graph which are less than biconnected with other components of the graph 3. A method as claimed in claim 2 wherein the step of analysing the current graph topology comprises the further step of:

(iv) identifying components within the graph which are in danger of splintering from the graph due to loss of an existing communication link.

4. A method as claimed in claim 1 wherein the step of analysing the current graph topology comprises the step of identifying components within the graph which are in danger of splintering from the graph due to loss of an existing communication link.

5. A method as claimed in claim 3 or 4 wherein the step of determining the available changes comprises the step of identifying a port within said one node that can be utilized to establish a new communication link with one of the components identified as in danger of splintering.

6. A method as claimed in claim 5 wherein the step of identifying a port comprises the step of evaluating existing communication links from said one node to identify an existing communication link that can be broken to provide a port without creating a new biconnected or less component.

7. A method as claimed in claim 2 wherein the step of determining the available changes comprises the steP of identifying a port within said one node that can be utilized to establish a new communication link with a node of another component with which the component of said one node is less than biconnected.

8. A method as claimed in claim 2 or 7 wherein the step of determining the available changes comprises the step of identifying a port within said one node that can be utilized to establish a new communication link with a node of another component with which the component o said one node is less than triconnected.

9. A method as claimed in claim 7 wherein the step of identifying a port includes the steps of determining the line of sight endurance of all port within said one node that are available to establish the new communication link; and identifying the one of said all ports having the greatest line of sight endurance.

10. A method as claimed in claim 9 wherein the step of identifying a port includes the further step of determining the effect on delay of all traffic transmitted by said one node that would result from establishing the new communication link with the identified port.

11. A method as claimed in claim 7 wherein the step of identifying a port includes the step of determining the effect on delay of all traffic transmitted by said one node that would result from establishing the new communication link with the identified port.

12. A method as claimed in claim 1 wherein the step of resolving conflicts includes comparing the descriptions of available changes received from other nodes with the available changes of said one node; identifying commonly available changes; and determining the new link assignment from the commonly available changes.

13. In a multinode communication graph including a plurality of communication nodes and having a known graph topology with each node a part of a component, each component made up of a number of nodes between one and the full number of nodes in the graph, each node having a plurality of communication ports, each port capable of establishing a communication link with a communication port of another node, an arrangement for assigning ports to communication links to maintain the connectivity of the graph, said arrangement comprising within each node;
    (a) means for analyzing the current graph topology to determine the current graph connectivity state;
    (b) means for determining the available changes said one node is capable of making to improve the graph connectivity;
    (c) means for broadcasting a description of the determined changes to other nodes in the graph;
    (d) means for receiving from other nodes in the graph broadcasts of descriptions of changes determined by the other nodes to be available to such other nodes to improve the graph connectivity;
    (e) means for resolving conflicts between link assignments in the determined changes of all nodes in the graph to determine a new link assignment for said one node; and
    (f) means for initiating establishment of a new communication path with another node in accordance with the determined new link assignment.

14. An arrangement as claimed in claim 13 wherein said means for analyzing the current graph topology comprises:
    (i) means for identifying components within the graph which are at least triconnected with other components of the graph;
    (ii) means for identifying components within the graph which are less than triconnected with other components of the graph; and
    (iii) means for identifying components within the graph which are less than biconnected with other components of the graph.

15. An arrangement as claimed in claim 14 wherein said means for analysing the current graph topology comprises:
    (iv) means for identifying components within the graph which are in danger of splintering from the graph due to loss of an existing communication link.

16. An arrangement as claimed in claim 13 wherein said means for analysing the current graph topology comprises means for identifying components within the graph which are in danger of splintering from the graph due to loss of an existing communication link.

17. An arrangement as claimed in claim 15 or 16 wherein said means for determining the available changes comprises means for identifying a port within said one node that can be utilized to establish a new communication link with one of the components identified as in danger of splintering.

18. An arrangement as claimed in claim 17 wherein said means for identifying a port comprises means for evaluating existing communication links from said one node to identify an existing communication link that can be broken to provide a port without creating a new biconnected or less component.

19. An arrangement as claimed in claim 14 wherein said means for determining the available changes comprises means for identifying a port within said one node that can be utilized to establish a new communication link with a node of another component with which the component of said one node is less than biconnected.

20. An arrangement as claimed in claim 14 or 19 wherein said means for determining the available changes comprises means for identifying a port within said one node that can be utilized to establish a new communication link with a node of another component with which the component of said one node is less than triconnected.

21. An arrangement as claimed in claim 19 wherein said means for identifying a port includes means for determining the line of sight endurance of all ports within said one node that are available to establish the new communication link; and means for identifying the one of said all ports having the greatest line of sight endurance.

22. An arrangement as claimed in claim 21 wherein said means for identifying a port further includes means for determining the effect on delay of all traffic transmitted by said one node that would result from establishing the new communication path with the identified port.

23. An arrangement as claimed in claim 19 wherein said means for identifying a port includes means for determining the effect on delay of all traffic transmitted by said one node that would result from establishing the new communication link with the identified port.

24. An arrangement as claimed in claim 13 wherein said means for resolving conflicts includes means for comparing the descriptions of available changes received from other nodes with the available changes of said one node; means for identifying commonly available changes; and means for determining the new link assignment from the commonly available changes.

* * * * *